United States Patent [19]

Mortoly

[11] Patent Number: 4,624,451

[45] **Date of Patent: * Nov. 25, 1986**

[54] EQUALIZER CLAMP

[75] Inventor: John L. Mortoly, Poughkeepsie, N.Y.

[73] Assignee: James L. Taylor Mfg. Co., Poughkeepsie, N.Y.

[ * ] Notice: The portion of the term of this patent subsequent to Dec. 25, 2001 has been disclaimed.

[21] Appl. No.: 683,370

[22] Filed: Dec. 19, 1984

Related U.S. Application Data

[63] Continuation-in-part of Ser. No. 299,341, Sep. 4, 1981, Pat. No. 4,489,925.

[51] Int. Cl.[4] ................................................ B23Q 1/04

[52] U.S. Cl. ........................................ 269/71; 269/74; 269/97

[58] Field of Search ........................ 269/71, 74, 81-85, 269/95, 97, 905, 57, 38; 248/223.4, 224.1, 224.2, 225.3 R, 243; 182/194, 151; 403/335-338; 211/191, 193

[56] References Cited

U.S. PATENT DOCUMENTS

| | | | |
|---|---|---|---|
| 800,685 | 10/1905 | Scoggins | 269/71 |
| 832,087 | 10/1906 | Scoggins | 269/84 |
| 918,192 | 4/1909 | Palmer | 269/57 |
| 967,383 | 8/1910 | Hunter | 248/243 |
| 977,609 | 12/1910 | Freeman | 248/243 |
| 1,273,136 | 7/1918 | Bergstrom | 269/57 |
| 1,320,808 | 11/1919 | Taylor | 269/57 |
| 4,447,029 | 5/1984 | Chapman | 211/193 |
| 4,489,925 | 12/1984 | Mortoly | 269/71 |

FOREIGN PATENT DOCUMENTS

| | | | |
|---|---|---|---|
| 623231 | 10/1962 | Belgium | 211/193 |
| 1226386 | 3/1971 | United Kingdom | 211/193 |
| 2125685 | 3/1984 | United Kingdom | 211/191 |

*Primary Examiner*—Robert C. Watson

*Attorney, Agent, or Firm*—Edward R. Weingram

[57] ABSTRACT

A clamping device which has a plurality of elongated clamping members joined to a clamp main frame by a pair of slideable side plates which allow the separate clamping members to be moved axially relative to each other and to the clamp main frame so that the clamping members can be adjusted to compensate for irregularities in those workpieces to be clamped that require coaction of two or more clamping members. The slideable side plates are fixed to the clamp main frame and connected to the clamping member by pegs slideable in slots on the clamping member and side plates. A locking nut and bolt clamp the side plates to the clamping member to fix the portion of the clamping member to the frame once the position of the clamping member is determined. The side plates can accommodate relative movement of the clamp support member and can be easily removed from or shifted along the support member. In one embodiment, the pair of side plates are engaged to a coacting pair of horizontal stationary clamp supporting members on the main frame. To provide for disengagement therefrom, the clamp carrier is raised to enabling relative movement along the supporting members and enabling removal therefrom.

8 Claims, 10 Drawing Figures

EQUALIZER CLAMP

RELATED APPLICATION

This application is a Continuation-In-Part of U.S. Ser. No. 299,341 filed of Sept. 4, 1981, now U.S. Pat. No. 4,489,925, the entire disclosure of which is incorporated herein by reference.

BACKGROUND OF THE INVENTION

1. Field of the Invention

This invention relates to clamping devices and, in particular, clamping devices adapted to hold articles which have irregularities that can be compensated for by the clamp.

2. Prior Art Clamps designed for glueing pieces of wood to form larger sections require that each of the several pieces of wood is aligned by a plurality of parallel coacting clamping members connected to a main frame. When the desired size of the section is achieved, each of the clamping members is then tightened to hold the pieces until the glue has set.

Many clamping devices have several sets of coacting clamping members attached to an endless carrier so that glued sections can be stored while the glue is setting and then removed from the clamping device systematically.

Each of the clamping members includes a pair of jaws between which the pieces of wood are laid. While one jaw of each individual clamping member is adjustable, the individual clamping members are normally maintained in fixed relationship to each other. If any of the pieces of stock are not uniform, the composite piece will be irregular, with front and rear edges not necessarily straight or parallel. Therefore, the jaws of the individual clamping members will not contact the edges of the work-piece with equal or even force. This results in non-uniform stress in the irregular section with consequent poor glueing results.

SUMMARY OF THE INVENTION

In order to overcome the problems in the prior art, the present invention sets forth a clamp member structured and arranged to be attached to a clamp main frame clamp members which incorporates means to adjust the clamp member relative to the frame. The adjustment is achieved by side plates which can be moved relative to the longitudinal dimension of the clamp. Therefore, multiple clamps arranged in parallel, connected to the common main frame can be adjusted relative to each other in order to accommodate for minor non-uniformities and variations in the size of the wood-pieces/or other stock which are clamped.

The adjusting means consists of side plates moveable relative to the clamp body and attached to the frame. The side plates are fixed in their position to the clamp frame and moveable with respect to the clamp member. They can be fixed with relation to clamp member by means of convenient fasting devices such as bolts or screws.

The side plates can accommodate relative movement of the clamp support members.

In another embodiment of this invention, the main frame includes a plurality of horizontal stationary clamp supporting members and a mounting means is mounted to each clamp carrier for the cantilevered mounting of the clamp member and for providing relative movement along the supporting member. Preferably, the pair of side plates are mounted on a coacting pair of clamp supporting members by an engaging means. The engaging means is capable of disengagement from said supporting members by raising the clamp carrier to enable relative movement along the supporting members and to enable removal therefrom.

Accordingly, it is an object of the invention to provide an adjustable clamp for holding pieces of stock for glueing into larger sections which equalizes stress on the stock pieces.

A further object of the invention is to provide an adjustable clamp for holding pieces of stock for glueing into larger sections that can be fixedly secured to a storage frame and yet can be adjusted to compensate for irregularities in the stock pieces.

Another object of the invention is to provide an adjustable clamp for holding pieces of stock to be joined by glueing with improved results.

Still another object of the invention is to provide an adjustable clamp which allows non-uniform pieces of stock to be joined by glueing.

Yet another object of the invention is to provide an adjustable clamp for joining pieces of stock in which jaws of the clamp will contact the edges of the stock pieces with equal force.

A still further object of the invention is to provide an adjustable clamp for holding pieces of stock to be joined by glueing which is simple and easy to adjust for best results with pieces of stock which are not uniform.

A further object of the invention is to provide an adjustable clamp for holding articles to be joined together with adhesive which allows the clamp to be fixedly secured to a frame and yet which is adjustable relative to articles being held by the clamp.

A further object of the invention is to provide an adjustable clamp for holding articles to be joined together with adhesive having a simplified adjusting mechanism.

Another object of the present invention is to provide an adjustable clamp for holding articles to be joined together with adhesive which allows the clamp to be fixedly secured to a frame which is easy to operate and adjust.

A further object of the present invention is to provide an adjustable clamp for holding articles to be joined together with adhesive which allows the clamp to be fixedly secured to a frame which is reliable in operation.

A still further object of the present invention is to provide an adjustable clamp for holding articles to be joined together with adhesive which allows the clamp to be fixedly secured to a frame which is durable.

Another object of the present invention is to provide an adjustable clamp for holding articles to be joined together with adhesive which allows the clamp to be fixedly secured to a frame which is relatively economical to manufacture.

A still further object of the present invention is to provide an adjustable clamp for holding articles to be joined together with adhesive which allows for change of position of the support members relative to the clamp members.

A further object of the present invention is to provide an adjustable clamp for holding articles to be joined together which enables the articles in the clamps to be tilted upwardly for easy insertion and removal of the articles to be joined together onto the rack holding them.

Another object of the present invention is to provide an adjustable clamp for holding articles to be joined together with adhesives which coacts with a substantially vertically disposed rack to enable easy manipulation of work pieces supported by the rack.

Another object of the present invention is to provide an adjustable clamp for holding articles to be joined together with adhesive which enables individual work pieces suspended from a rack to be manipulated without affecting the positioning of other work pieces mounted on that rack.

A still further object of the present invention is to provide an adjustable clamp for holding articles to be joined together with adhesive which enables an article being clamped to be lifted out from a support rack containing many such articles without requiring a sequential removal of other items from the support rack.

Another object of the present invention is to provide an adjustable clamp for holding articles to be joined together with adhesive which allows the clamps to be suspended in cantilever relationship from a rack or support member and to be easily moved along the support member.

Further objects and advantages of the invention will appear from the following description of an illustrative embodiment of the invention, the novel features of the invention being pointed out in the appended claims.

BRIEF DESCRIPTION OF THE DRAWINGS

The invention will be described with reference to the accompanying drawing in which.

DETAILED DESCRIPTION OF THE ILLUSTRATIVE EMBODIMENT

Figure 1:
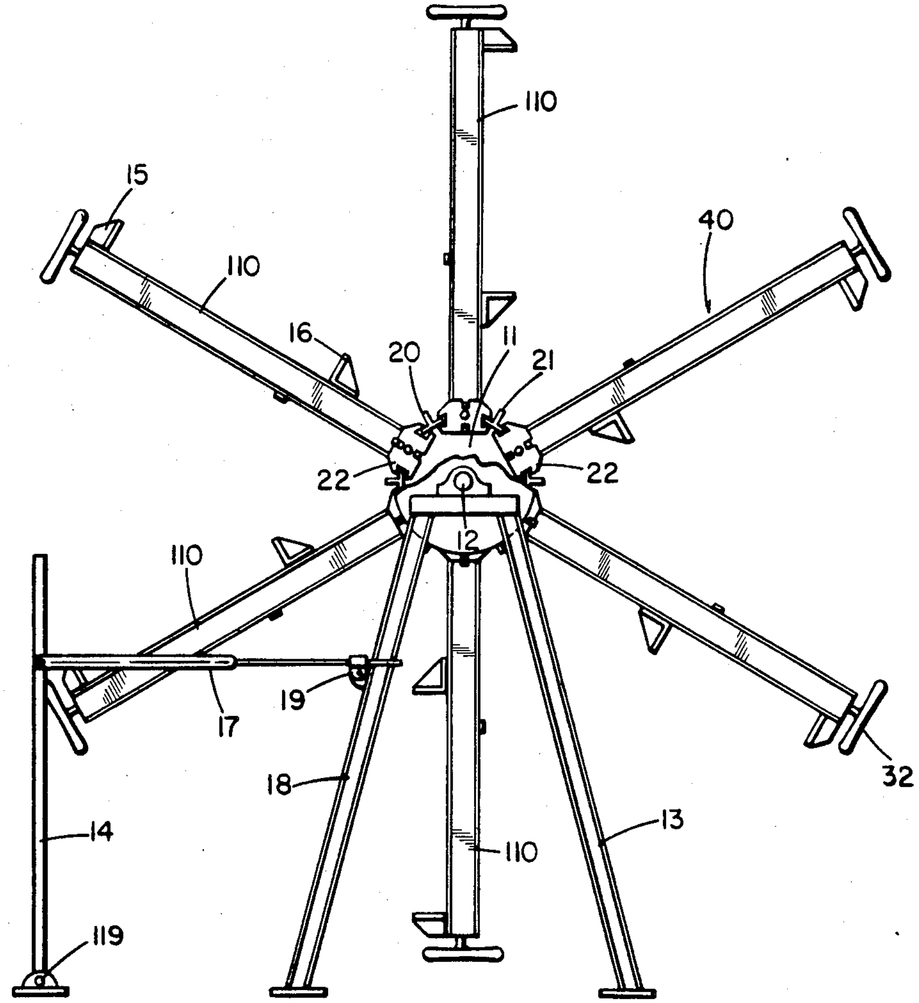
FIG. 1 is an elevational end view, partly in section, of a clamp carrier employing an equalizer clamp according to the present invention.

Referring to FIGS. 1–5 of the drawings, in FIG. 1, the clamp assembly generally indicated at 40 comprises a plurality of clamping members each designated at 10, each of which is connected by means of clamp supporting members in the form of two T-bars 20 and 21 transversally disposed with relation to the length of the clamp member, and each of which T-bars is supported at each of its ends by a mounting flange 11 that rotates on shaft 12 which is supported by main frame 13 and elevated from the ground by means of legs 18.

The front leg 18 of the main frame 13 is connected to an auxiliary frame 14 by means of an extendable horizontal support 17 mounted to the front leg 18 by bracket 19. Auxiliary frame 14 is pivoted by pivot 119 so that it can be pulled forward to let each series of clamps rotate downward. Auxiliary frame 14 is then returned to its upright position so that a bar (not shown) perpendicular to auxiliary frame 14 can support each series of clamps while the clamps are being loaded with work-pieces.

Referring to FIG. 7–10, depicting another embodiment of the invention and another inventive aspect thereof, the clamp assembly, generally indicated 340 comprises a plurality of clamping members each designated 310. Each of the clamping members 310 is supported by two tubing support members, i.e., an upper member 321 and a lower member 322. These members 321, 322 are transversely disposed with respect to the clamping member 310. Each of the support members 320, 321 are supported at each of its ends by a forwardly inclined support member 311, each of which is supported on its bottom by base member 312.

Figures 2, 3, 4:
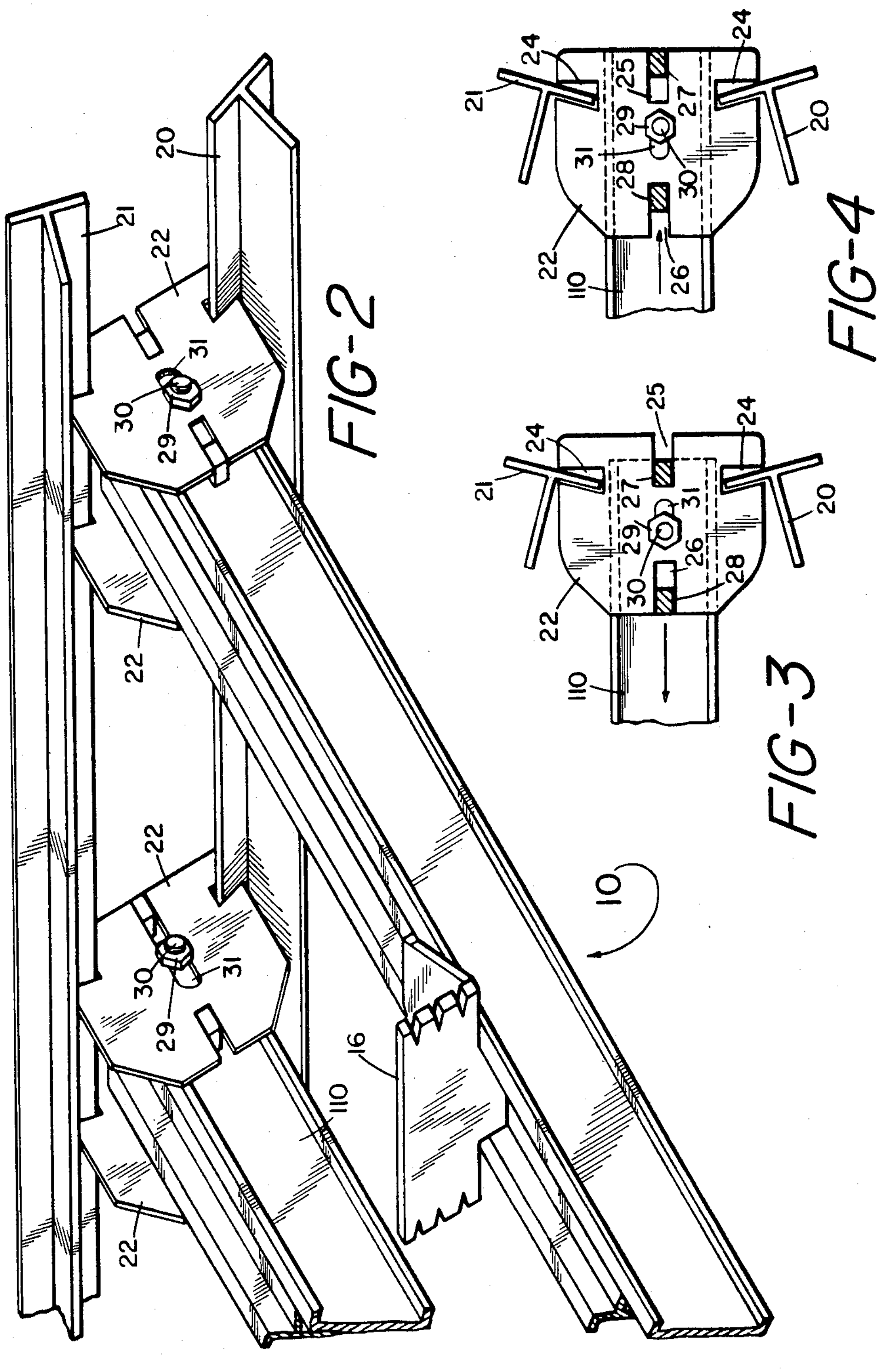
FIG. 2 is a side view, in perspective, of an equalizer clamp on a clamp carrier.
FIG. 3 is an end view of the equalizer clamp in one position.
FIG. 4 is an end view of the equalizer clamp in another position.
Figure 5:
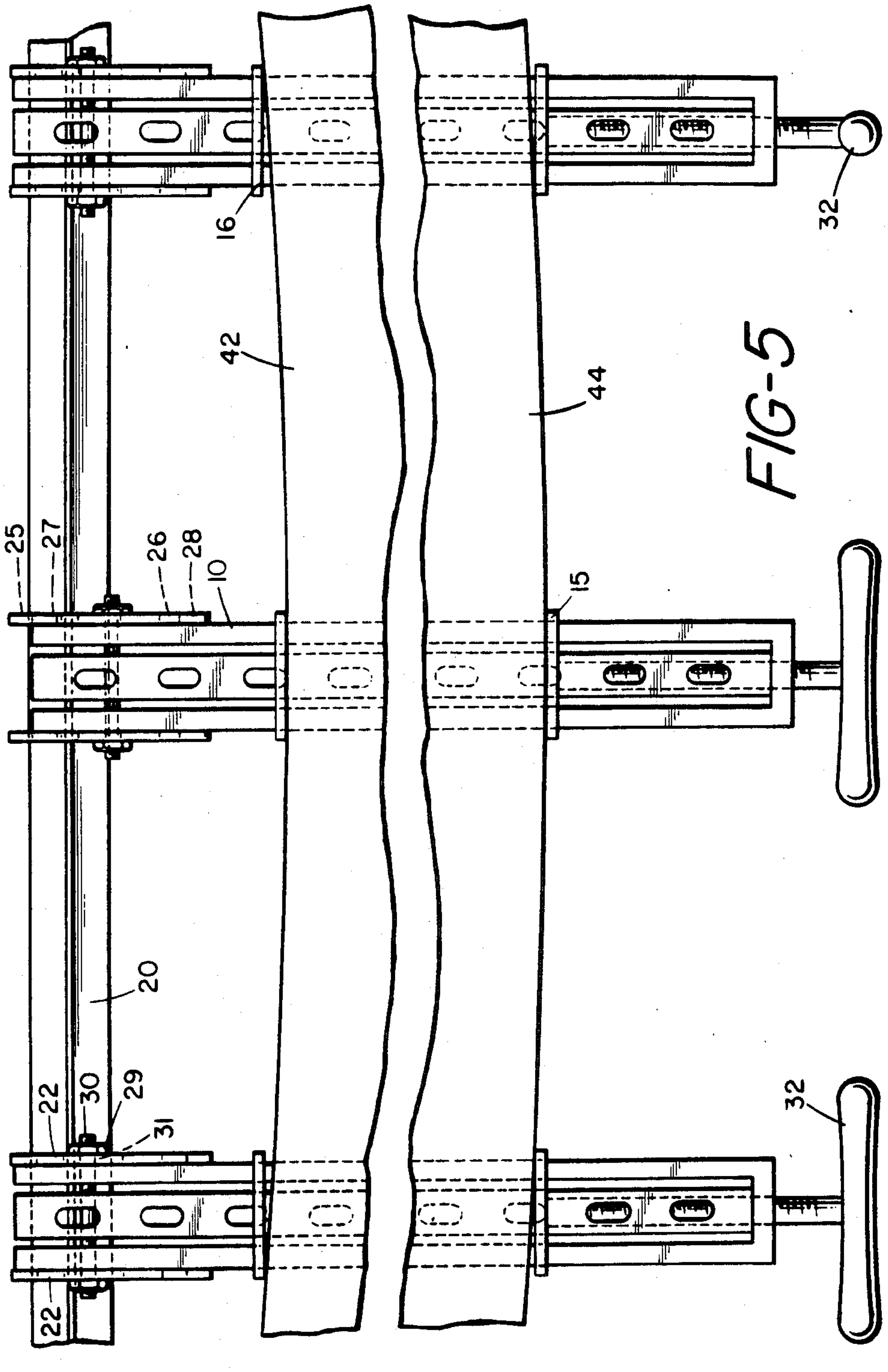
FIG. 5 is plan view of the clamp carrier showing wooden articles held by three clamps.

As shown in FIG. 2 and FIG. 5, each clamp member 10 has a clamp frame or clamp carrier 110 which is connected to upper and lower T-bars by means of side plates 22 positioned on either side of the rear of the clamp frame 110.

The embodiment depicted in FIG. 7–10 has a similar type arrangement with clamp carrier 309 mounted to the upper and lower support member 321, 322 by means of side plates 323.

Figure 7:
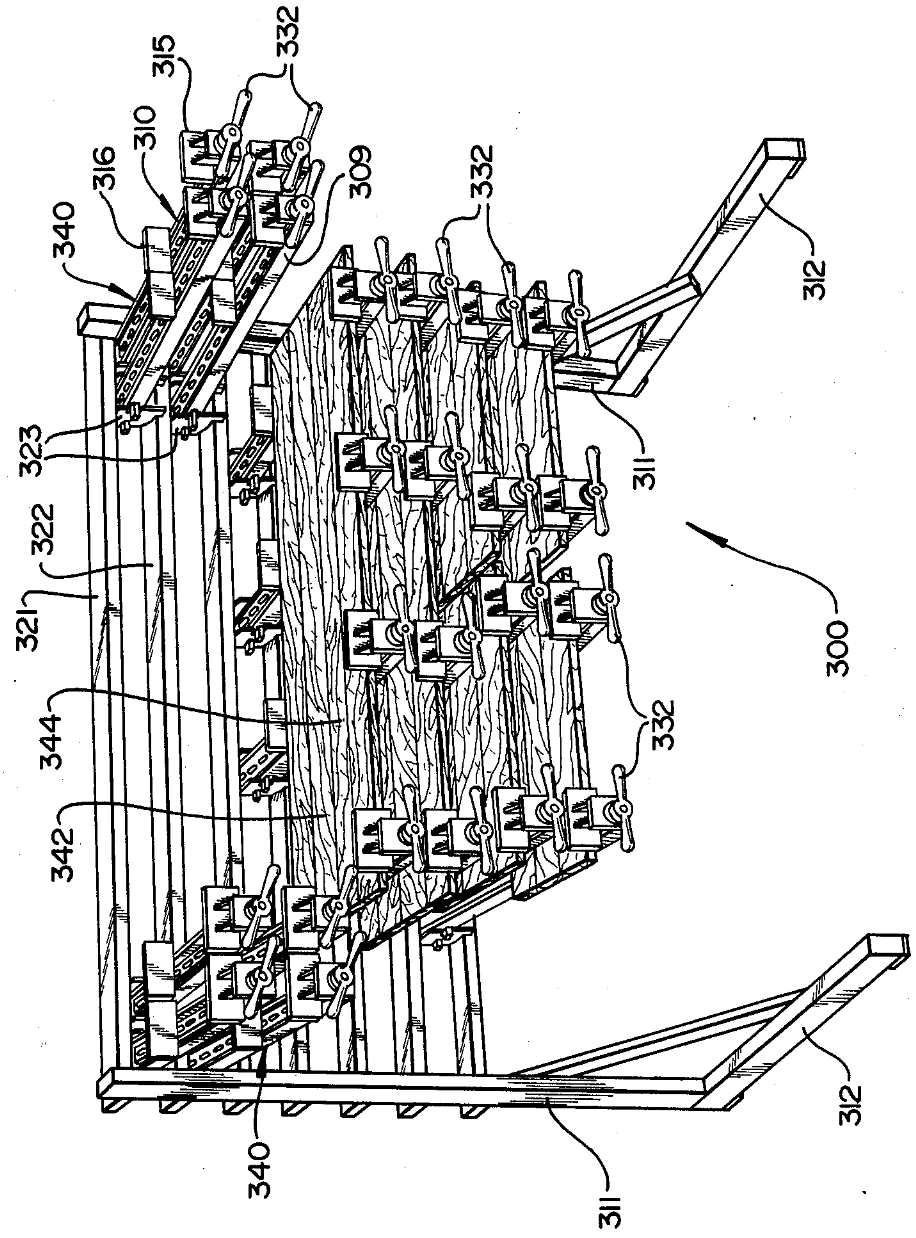
FIG. 7 is a perspective view of another type clamp carrier employing an equalizer clamp and still another aspect of this invention.

Referring to FIG. 2, 5, and 7, a plurality of clamps (at least two and usually more) are mounted to the same set of T-bars 20, 21 or support members 321, 322 to coact with each other in bonding large work-pieces 42, 44 or 342, 344. The work-pieces will be placed between the stationary front jaw 15 or 315, and the movable rear jaw 16 or 316, of the clamp. The position of the rear jaw is controlled by rotating handle 32 or 332 which is connected to a long threaded member (not shown) that engages the bottom of rear jaw 16 or 316.

FIG. 5 shows the clamp loaded with work-pieces which have a composite irregular shape. Since there are three or more clamps on a single item, if the front and rear edges of the item to be clamp are not absolutely aligned, then there would be a problem adjusting the positioning of the clamp to compensate for the irregularity of the material being clamped. An aspect of the present invention enables such adjustments. It allows the entire clamp to be moved forward or back a small amount to enable the clamp to accommodate for the difference in the size of the material being clamped. Once the appropriate position of the clamp is determined, the clamp can be tightened equally with the other clamps and the entire set of clamps then placed in the storage position of the carrier for curing the stock.

Referring to FIG. 5, the clamp adjustment is accomplished by means of the side plates 22 on either side of clamp frame 110. Each side plate 22 has upper and lower mounting slots 24 which engage the upper and lower T-bars. Therefore, the side plates on either side of the clamp frame 110 are fixedly positioned with respect to the T-bars 20 and 21; and accordingly, the main frame assembly 13.

Each side plate 22 has a front travel slot 26 and rear travel slot 25 which are adapted to engage front pin 28 and rear pin 27 respectively to enable the clamp frame 110 to slide the length of the front and rear travel slots. The front and rear pins can be press fit or welded onto the clamp frame 110.

In order to fix the relationship of the side plates 22 to the clamp frame 110, a tightening bolt 30 extends through a tightening slot 31 in each of the side plates 22 and compresses the side plates 22 against the clamp frame 110 by tightening the nut 29.

The relationship of the front and rear slots on the side plates and the front and rear pins on the clamp frame could, of course, be reversed so that the pins could extend inward from the side plate into slots formed in the clamp frame. Locking slot 31 could also be formed in the clamp frame rather than in the side plates 22. The slots preferably are about 3/16" longer than the pins to allow the pins to slide therein.

Figure 9:
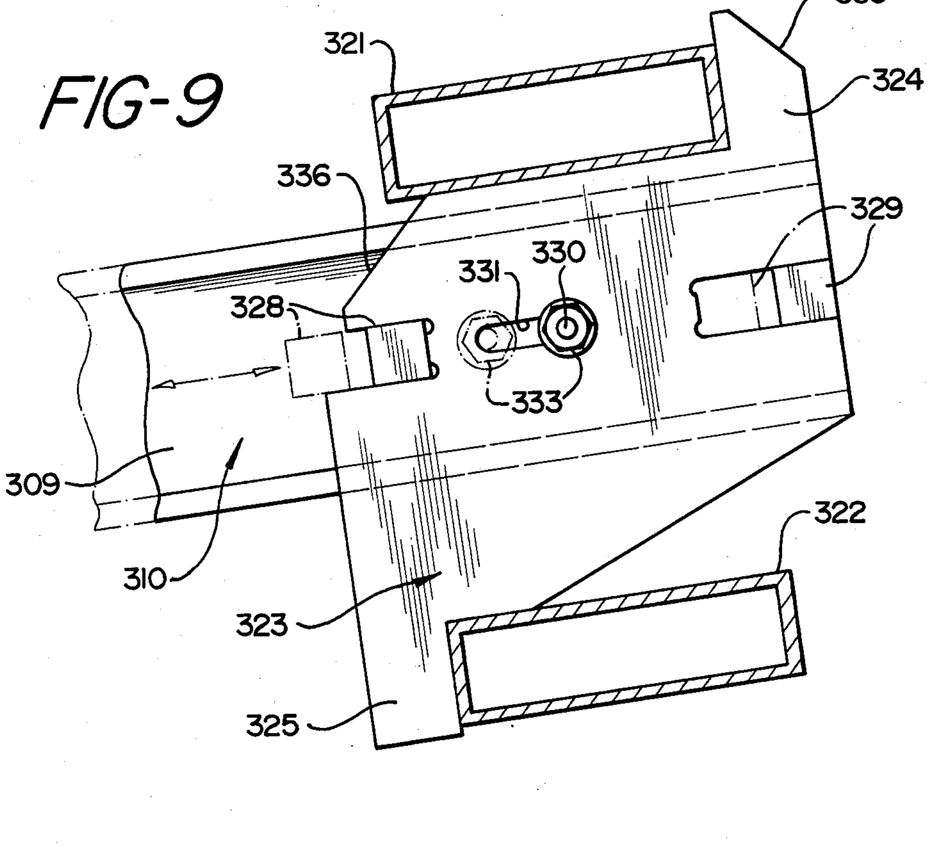
FIG. 9 is a detailed end view of the side plate for use in the clamp carrier of FIG. 7.
Figure 10:
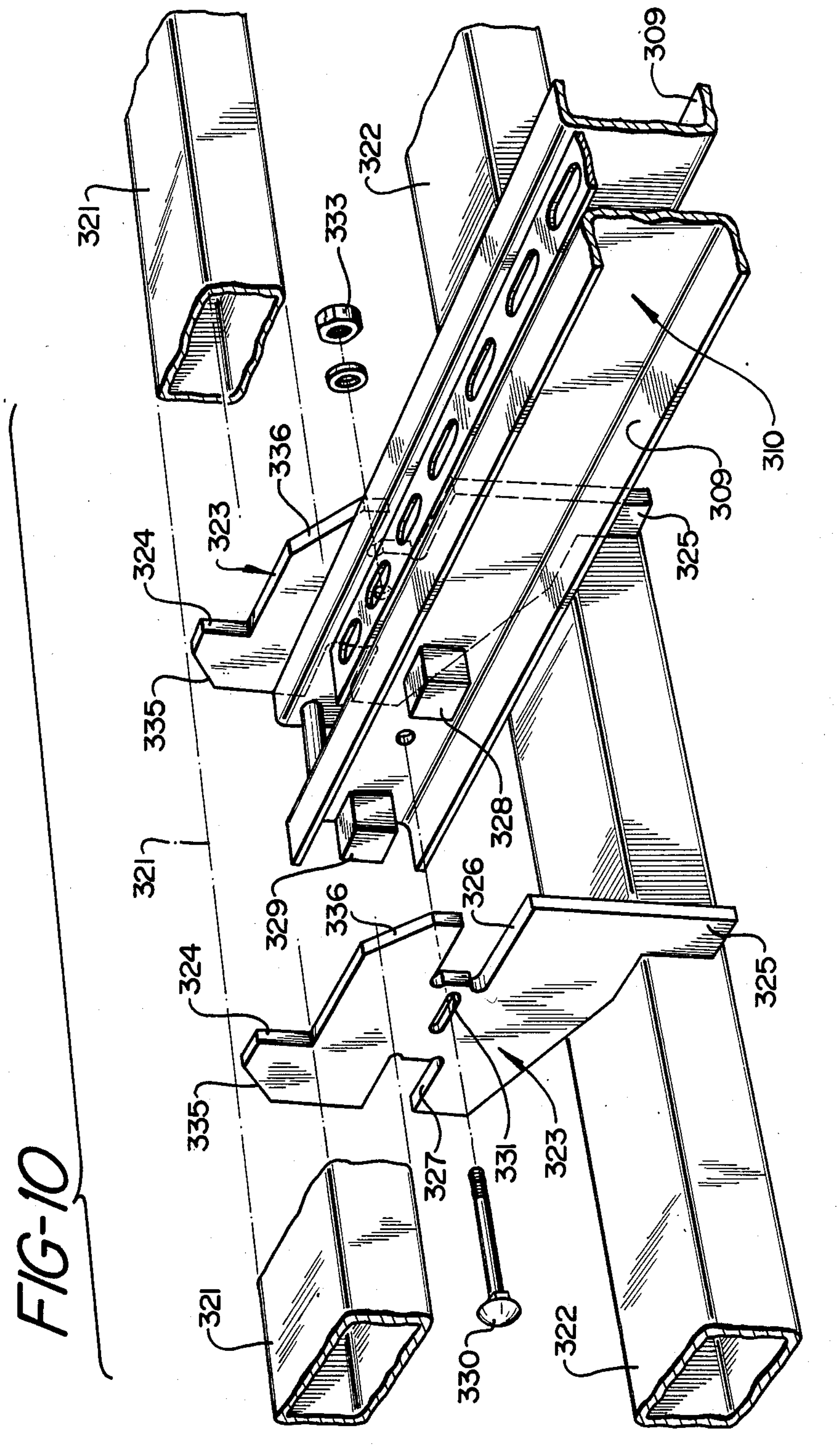
FIG. 10 is an exploded perspective of the clamp carrier, side plates and equalizer clamps in FIG. 7.

Referring to FIGS. 9 and 10, the clamp adjustment is also accomplished by means of the side plates 323 on either side of the clamping members 310 frame. Each side plate 323 has an upper and lower mounting elbow 324, 325 with the vertical faces parallel and offset from each other. The mounting elbows engage the upper and lower support members 321, 322. Thus, the side plates 323 on either side of the clamping members 310 are fixedly positioned with respect to the support members 321 and 322 when engaged therewith.

Each side plate 323 has a front travel slot 326 and rear travel slot 327 which are adapted to engage front pin 328 and rear pin 329 respectively extending from the clamp frame to enable the clamp frame 310 to slide the length of the front and rear travel slots. The front and rear pins 328, 329 can be press fit or welded onto the clamp frame 310.

In order to fix the relationship of the side plates 323 to the clamp frame 310, a tightening bolt 330 extends through a tightening hole 331 in each of the side plates 323 and through slot 334 in clamp frame 310 and compresses the side plates 323 against the clamp frame 310 by tightening the nut 333.

The upper mounting elbow 324 has a chamfered section 335 and the front of the side plate has a chamfered section 336.

The chamfers assist in the tilting of the clamps discussed below.

OPERATION

To operate the device depicted in FIG. 1–6, the individual clamp members 10 rest on the bar (not shown) supported by auxiliary frame 14. Rear jaws 16 are positioned to allow loading on the work stock into the clamp. After the work stock has been placed in the clamp, the jaws are brought down into contact with the rear edge of the stock. If there are any irregularities between the size of the stock or the shape of the stock that can be accommodated by movement of the clamps relative to each other, this is done by loosening the tightened nuts and allowing the clamp frame 110 to be moved relative to the other clamp frames and the T-bars 20 to accommodate the size irregularity. The tightened nuts can then be secured, if desired, and then the handles 32 of each of the clamps are tightened to the desired tension. As shown in FIG. 2, the clamp 10 closest to the viewer is in the forward position relative to the T-bars and the side plates, while the clamp furthest from the viewer is in the rear position relative to the T-bars or side plates. The embodiment depicted in FIG. 7–10 is operated in the same manner.

ANOTHER FEATURE

The clamping apparatus can be extended to carry numerous sets of coacting clamps in a conveyor-type arrangement as shown in U.S. Pat. No. 1,320,808, issued Nov. 4, 1919, to J. L. Taylor. In such cases, two clamp main frames are connected by a mechanical belt linkage containing flexibly interconnected clamp support members to which the clamp members are attached.

The sets of coacting clamp members rotate around the front clamp main frame, and pass along a horizontal portion, rotate around the rear clamp main frame, and travel the other parallel, horizontal portion of the loop back to the beginning or work station.

The relationship of clamp support members changes with relation to the clamp as the clamp moves through the loop. FIGS. 1, 2, and 3 show coacting sets of clamp members in a rotating mode of travel. When in a horizontal or any straight line mode of travel, the sets of coacting clamp members will be parallel and will be disposed perpendicular to the line of travel. The T-shaped clamp support members will also be parallel and uniformly disposed.

Figure 6:
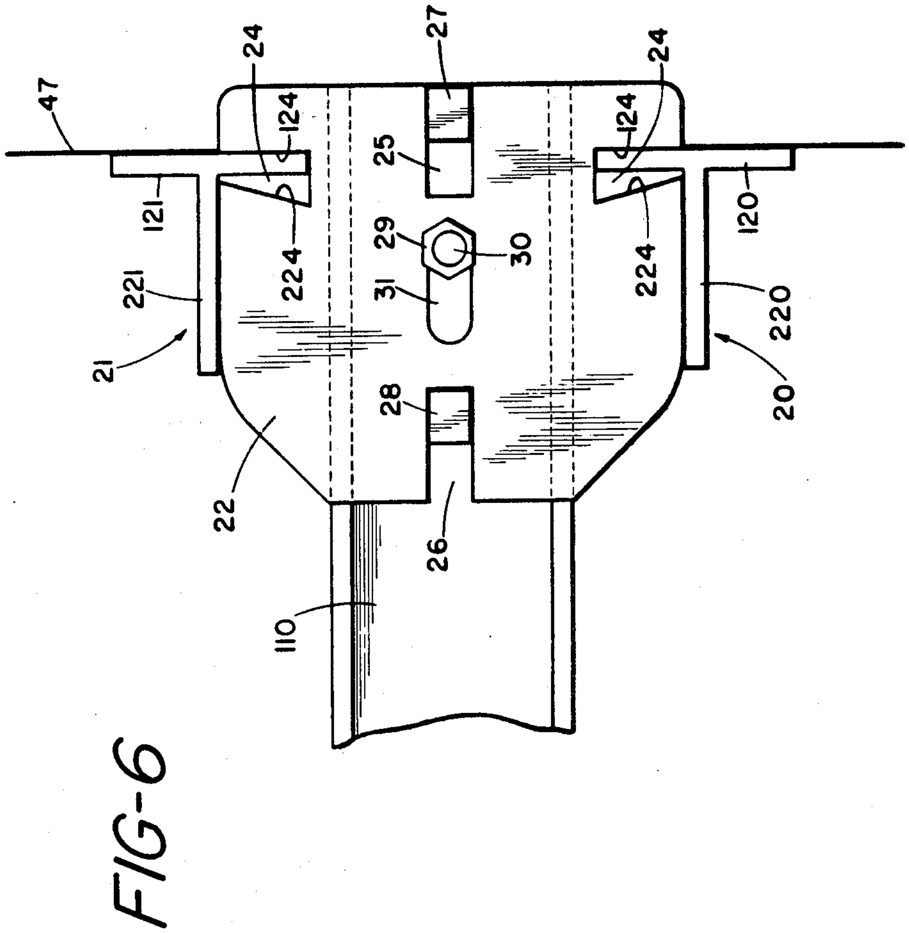
FIG. 6 is an end view of the equalizer clamp showing different orientation of the clamp support members.

This is shown most clearly in FIG. 6, where upper and lower T-shaped clamp support members 21 and 20 respectively having arms of the T's 121 and 120 respectively, and legs of the T 221 and 220 respectively. Each mounting slot 24 on each side plate 22 has a slanted front of the slot 224 and a rear of the slot 124. The rear of the slot 124 is perpendicular to the axis of the clamp frame 110.

Accordingly, when the clamp members 10 are traveling in the straight mode of travel, along path 47, the rear surface of arms 121 and 120 of T-shaped members 21 and 20 respectively, will be in contact with the rear 124 of the mounting slot 24. The legs 221 and 220 respectively of the T-shaped members 21 and 20 will be resting on the adjacent edges 122 of the side plates 22.

When traveling in the rotating mode, the T-shaped members 21 and 20 will be disposed with the legs of the T, 221 and 220 respectively, approximately radially to the curve of travel. Also, the arms of the T will be approximately tangent to the circumference of the curve of travel. The front 224 of the mounting slot 24 is angled approximately perpendicular to the angle of the radius of curvature, which is therefore equal to the angle of the leg of the T. The front surface of the arm of the T will therefore be in contact with the front of the mounting slot. Additionally, contact will be made with the rear of the mounting slot and the T at the top of the T near a point of intersection of the arm and leg of the T.

Accordingly, the stress imposed on the clamp support member is minimized by having the forces that are applied to the clamp support member by the side plate applied as much as possible at the strongest points of the T member, and by applying the forces over a relatively wide area of the T member.

While we have directed our discussion to a T-shaped clamp support member, it is obvious, that this discussion is equally applicable to any angled clamp support member, such as an angle iron section. Further, much of this discussion would also be applicable to other shapes of clamp support members, even such as plain rectangular cross-sections. This is aptly illustrated by the embodiment depicted in FIGS. 7–10.

ANOTHER ASPECT

Another aspect of this invention is illustrated in FIGS. 7–10, which depicts a modified form of the clamp carrier 309 and clamping members 310 in combination with a frame 300 for carrying such clamp carrier and member.

Figure 8:
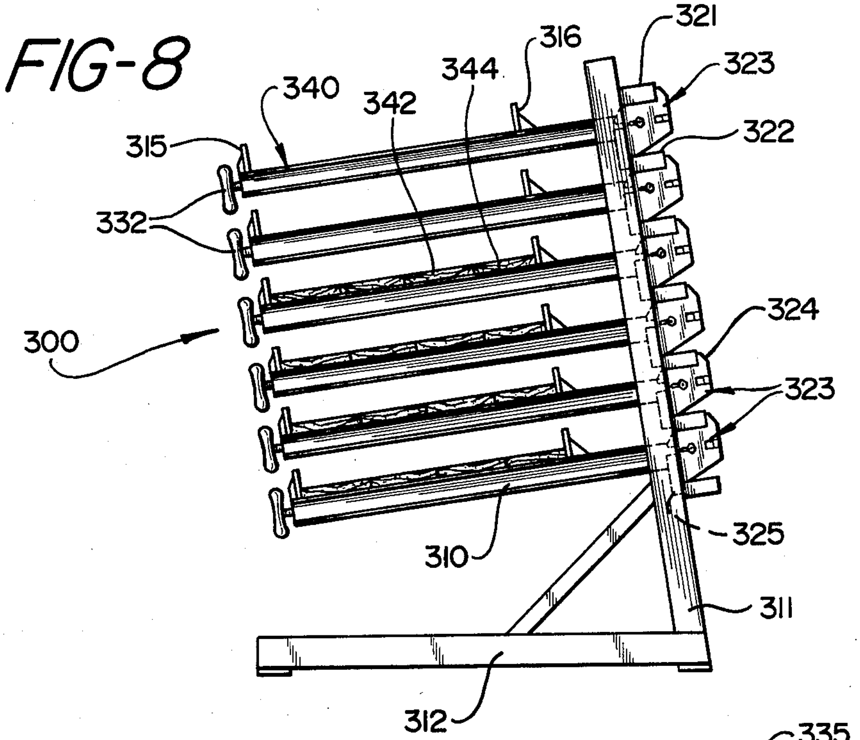
FIG. 8 is an elevational end view of the clamp carrier of FIG. 7.

Referring to FIGS. 7 and 8, the essential elements of this aspect of the invention are the clamp assembly generally indicated at 340 which comprises a plurality of clamp carriers 309 and clamping members 310. Each of the clamping members 310 are supported in a cantilevered manner by two tubing support members, in other words, an upper member 321 and a lower member 322 extending horizontally from the vertical side rails 311 which are mounted at a somewhat inclined angle to the bases 312. Preferably, the upper and lower support members 321, 322, vertical side rails 311, and bases are made of 3″×2″ tubing. The side plates 323 of the clamp carriers 309 coact with the upper and lower horizontal support members 321, 322 so as to hold a work piece at a slightly tilted angle which enables the individual pieces to be clamped in the sets of coacting clamp members to be stacked more conveniently.

The clamps work in units of at least two and often three or more on a single work piece. The horizontal members are spaced relatively close to each other in order to allow for compactness and efficiency of space and operation. The individual pieces of wood which are stacked to form a work piece placed in the coacting clamping members are spaced with just enough distance to enable the height of the clamps to clear the clamp immediately on the next level.

The lift-out clamp shown in FIGS. 9 and 10, and described above, offers a substantial advantage in connection with the vertical stacking frame as shown in FIG. 7 in that it enables a work piece to be tilted to remove the work piece and if desired the associated clamps from the rack without requiring the disturbing of the work pieces above or below the particular work piece on the rack. So, for example, an intermediate work piece on the rack can be tilted slightly so as to disengage the top and bottom mounting elbows 324, 325 of the clamp from the top and bottom horizontal tubing support members 321, 322. In the slightly tilted position, the work piece and the attached clamps can then be slid horizontally to a clear location where there would be no possibility of interfering with the clamps on the level above.

The entire work piece can then be removed from the clamping assembly without interfering with the other work pieces on the clamps. The clamps are merely loosened, and the finished work piece is lifted sufficiently to clear the front of the clamps and removed by the operator. The components of a new work piece can then be set up in the empty clamps, the clamps tightened, and the entire work piece and attached clamps tilted so as to be slid back to the previous position.

If it is desired to remove the clamps as well as the work piece, after sliding the work piece and the clamps to a clear area, the entire work piece and attached clamps can then be tilted the additional eight inches (8″) necessary to disengage the work piece and the clamp from the horizontal supports and thereby remove the entire work piece. Similarly, a new work piece can then be inserted by reversing the procedure. The chamfers 335 and 336 on the mounting elbow and the front of the side plate facilitate the location and sliding of the side plates with respect to the horizontal supports when horizontally moving or inserting and removing the clamp carriers.

The advantages of the side plates which fit into the rack are that the individual clamps can be tilted to slide them along the rack or remove them from the rack so that the boards which are being glued can be separately placed and removed from the rack without having to remove items in sequence.

Additionally, the side plates allow the clamps to be suspended from the rack in a cantilevered relationship, supported only at the connection points between the rack and the clamp. Because no other supports are necessary along the length of the clamp, the clamps can be stacked closely on the rack, making for more efficient working conditions and utilization of space.

It will be understood that various changes in the details, materials and arrangements of parts which have been herein described and illustrated in order to explain the nature of the invention may be made by those skilled in the art within the principle and scope of the invention, as expressed in the appended claims.

What is claimed is:

1. A device for holding in position articles to be joined comprising:

(a) a frame including a plurality of horizontal stationary clamp supporting members;

(b) a plurality of clamp members each connected to a coacting pair of clamp supporting members;

(c) each of said clamp members comprises a clamp carrier having a longitudinal axis and jaws thereon between which articles are to be joined and clamped;

(d) a pair of plate members are mounted on opposite sides of said clamp carrier for relative movement between the carrier and plates whereby said carrier is axially moveable in relation to its axis relative to said frame, the pair of plate members engaged to said coacting pair of clamp supporting members by an engaging means, said engaging means capable of disengagement from said supporting members by raising the clamp carrier to enable relative movement along the supporting members and to enable removal therefrom; and (e) locking means for fixedly positioning the clamp carrier relative to the plate members.

2. The device of claim 1, wherein the engaging members are a lower elbow for engaging a lower support member below the clamp carrier and an upper elbow for engaging an upper support member above the clamp carrier.

3. The device to claim 1, including means to slideably connect the plate members to the clamp carrier.

4. The device in claim 3 in which the means for connecting the plate members to the clamp carrier are pin members slideable in slots in the side plates or carrier member.

5. The device in claim 4 in which the pin members extend from said clamp carrier into slots in the plate members.

6. The device in claim 5 in which the slots are longer than the pin members by about 3/16″.

7. The device in claim 4, in which the locking means is a locking bolt extending through the carrier parallel to the pins.

8. The device in claim 4, 5, or 6, in which the pins are square.

* * * * *